Jan. 6, 1925.
W. WEILER
1,522,219
SYSTEM OF SPEED CONTROL
Filed Oct. 23, 1923
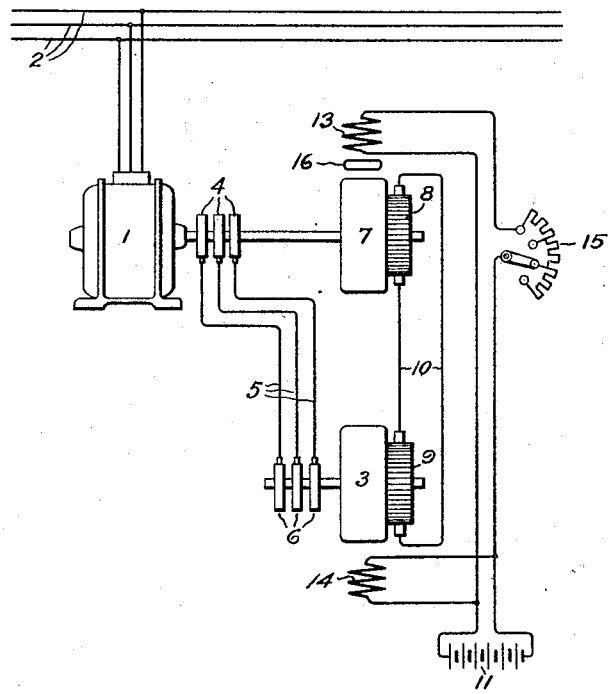
Inventor:
Wilhelm Weiler;
by Alexander S. Lint
His Attorney.

Patented Jan. 6, 1925.

1,522,219

UNITED STATES PATENT OFFICE.

WILHELM WEILER, OF BERLIN, GERMANY, ASSIGNOR TO GENERAL ELECTRIC COMPANY, A CORPORATION OF NEW YORK.

SYSTEM OF SPEED CONTROL.

Application filed October 23, 1923. Serial No. 670,221.

*To all whom it may concern:*

Be it known that I, WILHELM WEILER, a citizen of Germany, residing at Berlin, Germany, have invented certain new and useful Improvements in Systems of Speed Control, of which the following is a specification.

My invention relates to induction motor speed control systems wherein slip frequency current supplied from the secondary circuit of the induction motor is transformed by means of a rotary transformer into direct current or alternating current of a different frequency, which is utilized in any suitable manner, and has for its object the provision of means for preventing hunting or variations in speed at a frequency determined by the natural oscillating period of the rotary transformer.

It is well known that the speed of an induction motor may be controlled by means of a rotary converter or transformer having its slip rings connected to the secondary circuit of the motor and its commutator interconnected with a direct current motor mounted on the shaft of the main motor, a rheostat being provided in the field circuit of the direct current motor for the purpose of controlling the speed of the main motor. In the operation of speed control systems of this character, however, trouble has been experienced due mainly to the ease with which the speed of the rotary converter is caused to depart from synchronism and to oscillate at a frequency determined by the natural period of its armature. By these oscillations, pulsations in the primary and secondary currents of the main motor are produced, an alternating component of variable frequency is injected into the current supplied from the rotary to the commutator of the direct current machine, and the speed of the main motor is rendered unsteady. In the past, damper windings in the pole faces of the rotary transformers have been provided for the purpose of eliminating these oscillations, but such windings have in many cases proved inadequate to produce the desired result, because of the fact that the pulsating or alternating current delivered from the rotary transformer commutator under these conditions is supplied to the direct current machine which acts as inductive load due mainly to the development of its armature cross field, the value of which varies with the frequency of the oscillations. In accordance with my invention, the main poles of the direct current machine are provided with damper windings for suppressing the periodically varying cross field thus produced in its armature.

My invention will be better understood on reference to the following description, considered in connection with the accompanying drawing, and its scope will be pointed out in the appended claims.

Referring now to the drawing, there is shown in the single figure thereof a main induction motor 1 arranged to be supplied with current from the polyphase alternating current source 2 and having its secondary circuit interconnected with the armature winding of a rotary transformer 3, through slip rings 4, leads 5, and slip rings 6. Mounted upon the shaft of the main motor 1 is a direct current machine 7 having its commutator 8 conductively associated with the commutator 9 of the rotary transformer 3, through leads 10. A battery 11, or other suitable source of direct current, is provided for supplying exciting current to the field windings 13 and 14 of the machines 7 and 3, respectively, a rheostat 15 being provided in series with the field winding 13 of the direct current machine 7 for the purpose of regulating the speed of the main motor 1. Upon the poles of the machine 7 is also placed a short-circuited winding 16 of any suitable form for suppressing variations in the armature flux of the machine 7 caused by pulsations in the speed of the rotary transformer 3.

Assuming the induction motor 1 to be connected to the source 2, its speed of operation may be altered by manipulating the resistor 15. If the resistance in series with the field winding 13 of the motor 7 is increased, the field of this motor is weakened. As a result of weakening its field, the counter-electromotive force of the motor 7 is reduced, and it takes more current from the rotary transformer 3, which in turn must receive more current from the secondary winding of the main motor 1, thereby causing the main motor to develop a greater torque and increase its speed. In order to reduce the speed of the main motor 1, the excitation of the motor 7 is increased and there follows a series of results each the reverse of those just set forth. Under steady operating conditions, no flux cuts the short-circuited winding 16, due to the fact that the field produced by current flowing in the armature of the machine 7 is unidirectional and of constant value. Departure of the rotary transformer from synchronism, however, produces variations in the armature current, and consequently in the armature field of the machine 7, due to the injection into the current supplied to it of an alternating component produced by reason of the fact that the rotating field of the rotary transformer is no longer stationary in space, and to fluctuation in the value of the unidirectional voltage of this machine. Under these conditions, pulsations in speed and current not controlled by the rotary transformer damper windings because of variation in the phase of the currrent supplied to the direct current machine are effectively suppressed by the short-circuited winding 16.

While I have illustrated the direct current motor 7 as mounted on the shaft of the main motor 1, it may be coupled to a synchronous or induction machine connected to the polyphase line 2 or arranged in any other well known manner. My invention, therefore, is not limited to the specified embodiment illustrated and described, but has utility in connection with the various modified arrangements of the speed control system.

What I claim as new and desire to secure by Letters Patent of the United States, is:—

1. A control system wherein the speed of an inudction motor is varied in response to changes in the field current of a machine supplied with current from a rotary transformer connected between it and the secondary circuit of said motor, and wherein pulsations in speed and current are apt to be produced, characterized by the fact that damper windings are provided on the poles of said machine for suppressing said pulsations.

2. A system of speed control comprising an induction motor, a direct current machine for controlling the speed of said motor, and a rotary transformer interconnecting said motor and said machine, the pole pieces of said direct current machine being provided with short-circuited windings whereby pulsations in currents delivered to and supplied by said rotary transformer are effectively suppressed.

In witness whereof, I have hereunto set my hand this 2nd day of October, 1923.

WILHELM WEILER.